March 28, 1944. L. M. CHRISTENSEN 2,345,238
TREATMENT OF DISTILLERY RESIDUES
Original Filed July 26, 1938
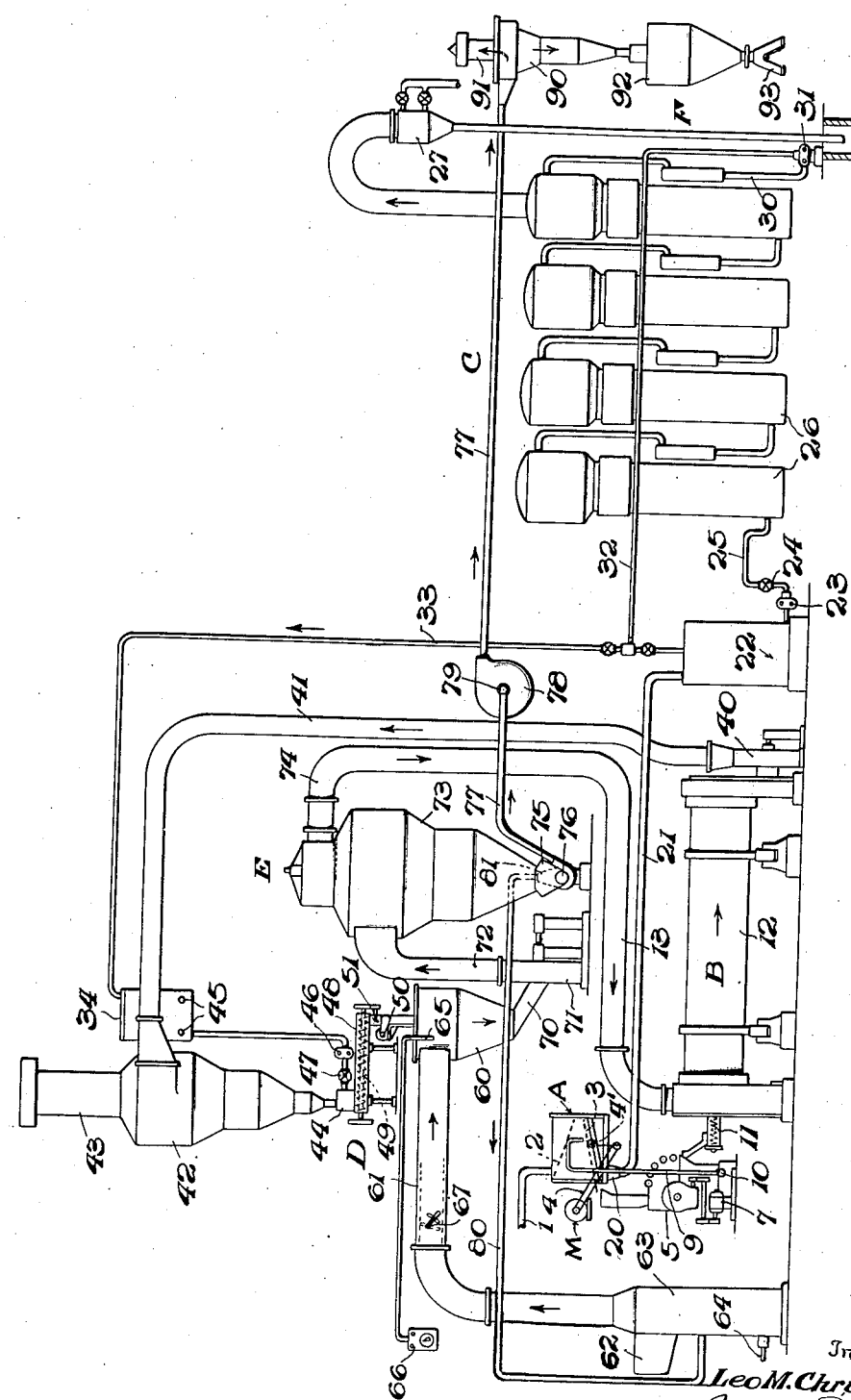
Inventor
Leo M. Christensen
Seward Davis
Attorney Patented Mar. 28, 1944

2,345,238

UNITED STATES PATENT OFFICE 2,345,238

TREATMENT OF DISTILLERY RESIDUES

Leo M. Christensen, Atchison, Kans., assignor to The Chemical Foundation, Incorporated, a corporation of Delaware Original application July 26, 1938, Serial No. 221,453, now Patent No. 2,225,428, dated December 17, 1940. Divided and this application July 14, 1939, Serial No. 284,562

9 Claims. (Cl. 210—149)

This invention relates to the treatment of distillery residues, more particularly to an improved apparatus for treating such residues.

The present application is a division of prior application Serial No. 221,453, filed July 26, 1938, now Patent No. 2,225,428, Dec. 17, 1940.

The production of alcohol from grains involves essentially the ultimate conversion of the starch content to alcohol and carbon dioxide. Since only substantially the starch is involved in the enzymatic and chemical conversions the other constituents of the grain appear, more or less unchanged, in the residual material after the dealcoholizing step. These unfermentable constituents, including the minerals, oils and proteins of the grain form a potentially valuable feed, and their value for this particular use is well recognized.

The present invention relates to a method of producing a feed from dealcoholized solutions which is characterized by an improved physical condition by reason of which its dietetic value is enhanced. The products producible under the invention, when operating on corn, for example, have a very high protein content usually not less than 28%, which content is practically 90% available. Such products are particularly advantageous as a feed for dairy cows since they are substantially as complete as milk casein in the content of amino acids and in addition (when derived from a mash fermented with brewers yeast) contain the valuable prolaction vitamins.

The recovery of these distillers' grains in such a manner as to retain the full dietetic value of the constituents presents many problems. The crude beer slop contains on the average about 7% of total solids, about one-half of which are in the form of relatively large suspended particles, and the other half in the form of very fine and highly dispersed suspensoids and colloids, and some soluble constituents. The recovery of these valuable constituents necessitates the handling and separation of very large quantities of water.

It has been proposed in the past to treat distillers' slop by passing the slop in hot condition over screens so as to separate out the larger and readily filterable particles. The separated wet solids were then further dewatered, as in a press, and were treated in a rotary steam or direct fire heated drier. The filtrate or thin slop from the first screening operation was treated in various manners, such as for example as in a multiple effect evaporator, so as to concentrate the solution to a syrup. It has been proposed in the past to produce a separate feed from this syrup and also to add the syrup to the larger filtered grains passing to the rotary drier.

The treatment of the finer protein material, that is to say, that occurring in the so-called "soluble" form, in the past has been attended with considerable difficulty. This material is of a colloidal nature and tends to form syrupy or gelatinous systems of high viscosity when in fairly highly concentrated form. Thus in the past when it has been attempted to dry such syrup down in a rotary drier, the material tends to stick to the sides of the drum. Furthermore, in the past it has been extremely difficult homogeneously to incorporate the concentrated protein syrup in the preliminarily separated solids. Such syrup, as noted above, is a liquid of relatively low fluidity and thus tends to coat the surfaces of the larger particles separated out on the screen. In these circumstances the protein syrup penetrates the larger particles to only a minor degree and uniform drying of the mixed product is therefore extremely difficult.

It has now been found that the valuable nutritious constituents of the original raw material may be substantially quantitatively recovered and in the form of a novel and improved product. A characteristic feature of the invention is the fact that the larger particles of the distillers' slop are first separated out from the slop by a special method of screening, are then dried down to a certain definite optimum moisture content, and are subsequently contacted with a protein solution of selected optimum concentration under such circumstances that the concentrated solution readily penetrates the preliminarily dried particles, so as homogeneously to be distributed therethrough. This mixed product is then subjected to a special type of flash drying whereby the product is dried down to the desirable extent and under such controlled conditions of temperature and time that caramelization and/or decomposition of the protein constituents is avoided. As will be seen more fully hereinafter, the major advantages of the invention may be attained by subjecting the larger solid particles or aggregates of the slop to a preliminary drying under controlled conditions of temperature such that this material is rendered absorptive to the relatively viscous concentrated protein syrup. This first step may therefore be regarded as a special treatment for improving the penetrability of the solids and in which there is achieved the concomitant advantage of reduction of moisture content. In the second major stage of the process the solids, of high penetrability, are impregnated or saturated with a protein syrup of optimum concentration under such circumstances that the solution is absorbed directly in the fibers, rather than being deposited on the surfaces of the fibers as a coating. The saturated solid particles are then amenable to a special type of flash drying whereby the moisture content is reduced to the desired extent and in the minimum time. In these circumstances, as will appear more fully, the thoroughly saturated particles are extenuated or dispersed through the hot gas phase and the individual particles are quickly and uniformly dried down in a minimum time, thus avoiding prolonged contact with high temperature gases and corresponding thermal decomposition.

It will be observed that the present method invokes several advantageously correlated concepts, the utilization of which insures a particularly effective drying with the production of an improved product. These broader concepts include the preliminarily controlled drying of the specially screened solids, i. e. the accurate reduction of the moisture content of these solids, not so much for the purpose of drying, per se, as for the major purpose of conditioning these solids for the subsequent optimum impregnation by the thin slop concentrate or protein syrup. The screened solids, when thus specially preconditioned, are then not merely wetted by the syrup, but are actually impregnated or saturated with the syrup. To insure such optimum impregnation, and resultant homogeneity in the product, as will appear more fully, the conditions of syrup concentration are carefully controlled such that the syrup produced in the new method is of optimum penetrability with respect to the preconditioned screened solids. It might well be observed at this point that, in the present process, the concentration of the syrup is not carried out to the maximum extent, i. e., to secure a very high protein concentration, but is controlled short of this point for the purposes stated. The saturated preconditioned screenings are then extenuated or highly dispersed in a gaseous medium and are flash dried with hot gases. After such flash drying or rapid removal of moisture from all surfaces of the particles, the temperature of the product is rapidly reduced to avoid charring and proteolytic decomposition.

To more completely explain the invention, a preferred form of apparatus for producing the product is shown in the accompanying drawings, it being understood that this is given as illustrative and not as the exclusive means available for employment under the invention.

In the single figure of the accompanying drawing is indicated, diagrammatically, a preferred arrangement of units which has been found to be effective. While not shown, it is to be understood that this apparatus is associated with a still house, the slop from the beer still of which is to be treated according to the invention.

The major stages of the process comprise a screening stage, indicated generally by the letter A, in which the crude slop, containing on the average about 7% of solids, is filtered or screened in a special manner to separate the wet solids from the thin filtrate or slop; a preconditioning-drying stage, indicated generally by the letter B, in which the screenings from stage A, and which contain about 70% of moisture, are dried down to a definite moisture content; a concentration stage C, indicated on the drawings as a quadruple effect evaporator in which the filtrate or thin slop is concentrated down to a definite concentration of solids; an impregnating stage D, indicated on the drawing as in mingler, in which the preconditioned screened solids are impregnated with the concentrated protein solution; a drying stage E, in which the impregnated preconditioned solids are dried down under definite conditions of temperature control so as to produce a light flocculent, dried feed; and a final stage, F, indicated as a hopper structure in which the dried solids are weighed and bagged.

Each of these stages may be modified considerably as to structure and design, while fulfilling the major functions demanded according to the present invention.

Considering the apparatus and the flow of material in more detail, and as is particularly described in copending application Serial No. 221,-453, the beer slop is withdrawn from the beer still or from a storage receptacle by a pump (not shown) and is conveyed through line 1 to the dry house unit. The beer slops are discharged from line 1 into the screening stage A. In the past it has been suggested to screen the beer slop and to concentrate the filtrate as by evaporation. In all such methods, however, separation has been effected with one screen. As a result of considerable experimentation in this field, it has been found that effective separation of the solids from the filtrate involves in reality two operations, namely filtering and draining. It has been determined that the optimum conditions for these two operations are not the same so that maximum efficacy cannot be obtained with one screening device, as in the past. When, however, the separation, so to speak, is broken down into two phases or operations the optimum conditions for each phase may readily be established and a consequent higher efficiency obtained.

According to the present invention, therefore, the separation stage A is comprised of two operations; a filtering operation effected by the fixed screen 2 and a draining operation effected by the vibrating screen 3. The screen 3 may be vibrated in any suitable manner as by providing a resilient mount for the screen and effecting its vibration or oscillation by means of the motor M which, through the transmission 4 drives a cam or eccentric 4', the latter effecting vibrating movement of the screen. This mechanism is of course merely illustrative. Any other method of effecting the desired vibration may be used as, for example by suitable electro-magnets.

As indicated the screens 2 and 3 are mounted and operated so as to secure optimum separation of the solids from the liquid in each stage. The screen 2 which may be either stationary or rotary is set at a pitch of between 10° and 15°. It has been determined that this is the optimum angularity for the separation of liquid from the thin slurry or beer slop.

The conditions for optimum draining, i. e. removal of liquid from a heavy slurry, as noted are different from those for filtering. In the present method draining is effected with a vibratory screen set at a pitch of between 20° and 30°. This angularity not only insures effective draining but also causes the screen to function very effectively as a jigger conveyor transporting the hull fibers at the optimum rate to the discharge end of the screen.

The solid portions of the slops, separated out by the screens 2 and 3, are passed continuously to the press 5. This press may be of any suitable type of construction and is illustrated as a series of press rolls 6, driven through any suitable transmission mechanism by the motor 7. In this device the screenings discharged from screens 2 and 3 are subjected to mechanical pressure to express additional amounts of solution therefrom. The liquid which is expressed from the screenings accumulates in a suitable container in the lower section of press 5 and is recycled through pump 8 and line 9 to either screen 2 or 3.

The pressed wet grain is discharged through the trough 10 and conveyor 11 to the drying-preconditioning stage B. This stage preferably comprises a suitable rotary drier 12, into one end of which is simultaneously fed the screenings from the press 6 and hot exhaust gases from the flash drying unit through the conduit 13.

The filtrate obtained from the material passing over the screens 2 and 3 is accumulated in the trough 2 and is passed thence either under a gravity head or pump pressure through the line 21 to the thin slop storage tank 22. From this tank the slop is picked up by pump 23 and passed, in amounts controlled by valve 24, through the line 25 to a suitable concentration stage and preferably to the quadruple effect evaporator 26 as shown. The steam lines and other connections of the quadruple effect evaporator, for the sake of simplicity, have been omitted but it being understood that any suitable type of multiple effect evaporator may be employed for this stage. Connected to the last effect is the barometric condenser unit 27 which, similarly may be of any suitable construction and preferably, as shown, comprises a multiple jet barometric condenser. The concentrated slop or syrup is withdrawn from the last effect through the line 30 and is forced by pump 31 through the lines 32 and 33 to the syrup tank 34, from whence it may be passed, in a manner to be described, to an impregnation stage in which it is utilized to thoroughly saturate the preconditioned screened solids.

Where circumstances so require, as for example when the unit is shut down, syrup accumulating in the last effect may be by-passed through line 33' to the storage tank 22.

The solid material separated out by the screens and which has been preconditioned in the stage B is picked up by the exhaust fan 40 and is forced upwardly through the line 41 to the rotary drier cyclone 42. This cyclone is provided with the flue gas exhaust vent 43 which may discharge to the atmosphere or may be connected to any suitable absorption unit for the recovery of valuable components of the flue gases.

The hot, partially dried screenings pass downwardly through the cyclone 42 to the hopper 44, where they are sprayed or otherwise intimately contacted with the protein syrup or concentrate. To facilitate impregnation of the screenings by the syrup, such syrup is preferably heated to an elevated temperature by means of steam coil 45 and is forced, under pressure, by means of the pump 46, into the hopper 44. The flow of the syrup may be controlled by means of regulating valve 47. While, as indicated, it is preferred to heat the syrup and force it under positive pressure, it is clearly to be understood that the heating means 45 may be dispensed with and gravity flow of the syrup utilized.

After being wetted by the syrup, the solids are tumbled in the mingler 48. This mingler is provided with the screw conveyor 49 which serves to convey the material from the hopper to the flash drier. While the screenings are moved through the mingler, they are continuously agitated to insure complete wetting of the screened particles by the solution and are insured an adequate length of time or travel so as to permit thorough impregnation by the syrup. The impregnated screenings are then discharged from the mingler to a rotary feeding mechanism 50 in which the screenings are dispersed or broken up to prevent agglomeration and clogging of the unit. It has been found advisable to insert an air damper 51, opened to a sufficient degree, in the line between the rotary feeder and the flash drier. In these circumstances, due to the flow of gases through the unit, a flow of air through the damper 51 is induced into the feed line which serves most effectively to prevent clogging of the line.

In accordance with a major concept of the invention, as explained hereinbefore, the preconditioned and syrup-impregnated screenings are then discharged into the flash drying stage E, that is to say, into an enlarged confined area in which, while in dispersed or unagglomerated condition, the screenings are contacted with high temperature gases moving at relatively high velocity. In these circumstances the individual particles are conveyed through a zone in which they are contacted, over their entire area, by hot gases. As a result of such hot gas drying while the particles are dispersed or in extenuated condition, the moisture content is rapidly abstracted. As shown, the screenings are discharged from the rotary feeder into the flash drier 60, to which drier is fed a gaseous drying medium from the inlet line 61.

Preferably the drying medium is comprised of hot flue gases. Where the furnace section of the plant is operated with gas as the fuel, such flue gases may be withdrawn directly from the furnace itself. In other circumstances, or in any circumstance, if so desired, such flue gases may be withdrawn from the main furnace of the plant and passed through a filter (not shown) and then through the inlet 62 to the flue gas heater 63. This heater may be provided with suitable heating means, such as the gas burners 64. The flash drier, it will be noted, is provided with the pyrometer 65, which is connected to the temperature controller-recorder 66. This instrument may be associated with the gas burners 64 or with an air damper 67 in a manner known to those skilled in the art, so as accurately to control the temperature of the gases entering the drier at any desired value.

The flue gases, as shown enter the flash drier 60 at the upper section thereof and preferably tangentially. The impregnated screenings passing down the central zone of the drier are thus dispersed and given cyclonic motion. The hot flue gases with the dispersed solids then pass through the flash drier discharge 70 and are picked up by the flash drier fan 71, driven by any suitable mechanism. The gases with their suspended solids are thus forced upwardly through the line 72 and are injected tangentially into the upper portion of the flash drier cyclone 73. In the enlarged flash drier cyclone the large solids gravitate towards the bottom and the gases are withdrawn from the upper section of the cyclone and are passed through line 74 to the pre-drying stage B, that is to say, to the inlet of the rotary drier 12.

As explained in copending application Serial

No. 221,456 there is a tendency for the feed to accumulate and to char or ignite at the discharge of the drier 60. This difficulty is completely avoided by adopting the construction shown, that is, to connect the flash drier to the intake of fan 71 through the medium of a substantially straight pipe section 70 which is set at an angle which is less than the critical angle of repose of the solids.

As will particularly be observed, the bottom of the cyclone 73 is somewhat enlarged as at 75. Connected to this section of the cyclone is the blower 76 which is provided with an air inlet line 77. During operation this blower picks up the dried solids accumulating in the bottom of the cyclone, immediately and intimately mixes these with cooler air, admitted through the air intake 76, and forces them through the discharge line 77 toward the bagging stage F. As will be seen more fully hereinafter, these dried solids reach the bottom of the cyclone at a quite elevated temperature, and in order to prevent too drastic drying or charring, not to say actual combustion, it is necessary that such solids be quickly cooled well below the temperature attained in the drier. This quick or flash cooling is effected to a considerable degree by the blower 75 in that, in the manner explained, it induces a rapid flow of cooler air and intimately mixes this with the solids. To positively insure against thermal decomposition of the product, the supply of air to the air inlet 76 may be refrigerated or, as shown, a supplemental blower 78, having the air inlet 79, may be interposed in the discharge line 77. Preferably this is disposed in rather close proximity to the blower 75 so as to insure a steep temperature gradient for the solids. Blower 78 thus serves as, so to speak, a booster blower and functions rapidly to force the dried solids to the bagging equipment and also serves as a supplemental cooling means to positively insure a rapid abstraction and dissipation of heat from the solids.

As intimated hereinbefore, the flash drying of distillers' spent grains must be carried out under special conditions in order to insure against charring and combustion. It has been found in actual operations, that in some instances, even when blower 75 was operating, that combustion of the solids occurred. It was determined that this was due to the retention of the hot gases in the base of the cyclone which overheated the solids before they could be withdrawn. Since these solids have an appreciable specific heat, contact with hot gases for any appreciable length of time would tend to cause combustion. After considerable experimentation it was discovered that such a contingency could positively be avoided by withdrawing a portion of the gases from the lower area of the cyclone and preferably from a point relatively closely adjacent the solids discharge duct. The amount so withdrawn need not be great and, in any event, considerably less than the quantity discharged through the line 74. The withdrawal of a modicum of these hot gases from the zone where the hot solids tend to accumulate appears to reduce the temperature below the critical or danger point.

Such a beneficial result may be secured by the method shown on the drawing. As there shown, a discharge pipe 80 is in communication with the interior of the cyclone 73 and near its lower end. Such pipe terminates in an inverted cone 81 which, at the one time, provides a deflecting baffle over which the descending solids pass, and a bell mouth intake for the hot gases. The other end of the line 80 may be connected to a suitable source of suction so as to insure a positive flow of gases from the base of the cyclone. In order to conserve the heat of those gases and thereby insure thermal economies in the operation, the discharge end of the duct 80 preferably is connected to the flue gas heater in the manner shown. In these circumstances the aspirating effect of the gases passing up through the heater 63 induces a flow of hot exhaust gases through the line 80 and thus, to a commensurate extent, cools down the solids. With this type of structure, it has been found that the fire hazard hereinbefore mentioned is completely avoided.

The process which is carried out in the described apparatus must be controlled carefully to assure the production of the improved product. As noted, the operation effected in preconditioning stage B is primarily for the purpose of insuring optimum penetrability and absorption of the syrup or concentrate from stage C. If insufficient water is removed from the solids in this stage, they will absorb considerably less of the syrup than is desirable, due to the fact that such wetted solids are near their point of liquid saturation. Again, if the solids passing to the mingler are too wet, a good portion of the syrup which is picked up in the mingler will appear as a viscous coating around the particles. If, on the other hand, the solids are subjected to maximum drying in stage B, the relatively viscous syrup, from the concentration stage C, does not actually penetrate the solids but forms a coating on the surface, which coating is partially decomposed in passing through the flash drier.

It would seem that the drier the particles which were fed to the mingler, the more rapid and complete would be the penetration by the syrup. This, however, is not the case, due in part to the fact that excessive drying causes the hull fibers to contract or shrink and thereby reduce the porosity and penetrability, and in part to the fact that the interfacial tension between the dried particle and the syrup is much greater than that between a wetted particle and the syrup. The process must, therefore, be so conducted as to attain the optimum between the low potential penetrability of a dried particle, on the one hand, and the low quantitative absorption of a partially saturated particle, on the other. It has been found as a result of considerable experimentation that the optimum preconditioning, i. e., the control of the moisture content of the solids discharged from stage B to stage D, lies between approximately 15% and 25% of the moisture. In this range, optimum wettability and penetration, coupled with optimum homogeneous absorption of the syrup in the fibers, is secured.

Similarly, to secure the full advantages of the invention, the characteristics of the syrup should be controlled within certain optimum limits. The concentration effected in stage C is therefore carried out not to secure maximum, but to obtain optimum concentration, i. e., that concentration of the protein solids such that optimum penetration of the syrup in the preconditioned solids is obtained. If the concentration of the solids in the syrup is too low, the protein content of the ultimate feed, and hence its value, is correspondingly low. If, on the other hand, such concentration is too high, the syrup is of too low a fluidity to insure the desired wetting of and penetration in the preconditioned spent grains and such a concentrated syrup largely coats the fibers particles which, in the manner explained, tends to decompose in passage through the flash drier.

As a result of numerous tests, it has been found that the optimum concentration of the syrup, for the purposes of the invention, lies in the range of from approximately 20% to 25% of solids. With such a correlation established, namely, the wetting of hot distillers' spent grains having a moisture content of from 15 to 25%, with a syrup containing approximately 20 to 25% solids, the syrup rapidly wets and penetrates into the interstitial spaces of the grains, that is to say, the protein syrup is substantially uniformly or homogeneously distributed throughout the body of the particles of spent grains, rather than occurring as a heterogeneous outer surface coating.

It will be observed at this point that, if desired, surface tension reducing agents may be added to the solution in tank 34, or at any other appropriate point in the circuit, to increase the speed and degree of penetration.

With such a controlled preconditioning treatment of the spent grains and the described regulated concentration of the thin slop, coupled with a flash drying and flash cooling of the impregnated grains, the described novel improved product is produced. Such a product contains from substantially 28% to 35% or more, of protein material of which substantially 90% is available. The new product is of a very light brown color and of a characteristic light and fluffy texture as compared to the older types of products which are of a darker brown color and of a more gummy texture.

In order to fully explain the invention to those skilled in the art, a typical operation will be described. It is to be understood that this is an illustrative run and is not intended to restrictively define the permissive manipulative variations which are comprehended within the broader concepts of the invention.

In the production of the improved product, in the type of apparatus illustrated, the beer still residues are continuously pumped through line 1 and discharged into the screening section A. The screened and pressed grains, which at this point contain about 70% of moisture, are passed to the rotary drier 12 at the entrance of which they are intimately contacted with hot flash drier exhaust gases flowing through line 13. The exhaust gases entering the drier 12, which are about half saturated with moisture, preferably are maintained at a temperature of approximately 375° F. The spent grains and hot gases pass together through the rotary and are picked up by the fan 40. The speed of flow or retention period in the rotary 12 may be controlled by the fan 40 so that the gases leave the drier at a temperature of approximately 250° F. The spent grains are then forced upwardly through the line 41 to the cyclone 42. Under these conditions of operation the spent grains are discharged to the hopper 44 with a moisture content within the optimum range, that is to say, between about 15% and 25% of moisture.

In the hopper 44, or its equivalent, the preconditioned spent grains are contacted with a spray of hot protein syrup of a concentration of between substantially 20% and 25% of solids. The quantity of the concentrate sprayed upon and mingled with the preconditioned grains is so controlled as to increase the moisture content of the preconditioned grains back to approximately 75%, in which condition they are then discharged to the flash drier. It will be appreciated at this point that the moisture content of the spent grains entering the flash drier 65 is substantially the same as that entering the preconditioning stage B with the notable exception that the spent grains entering the drier 65 are saturated with a protein syrup of high concentration.

In the drier 65, in the manner described, the saturated and impregnated spent grains are contacted with a high velocity stream of hot gases. In the present operation, as explained, the temperatures of the gases entering the drier are carefully controlled. It has been found as a result of considerable experimentation that the temperature of inlet gases should not exceed 500° F., and preferably should be maintained at about 475° F. The spent grains passing downwardly through the flash drier 65 are therefore contacted for a brief period with a high velocity stream of hot gases. The gaseous suspension of the solids is then picked up by the fan 71 and forced to the cyclone 73. In ordinary circumstances it will be found that the temperature of the mass passing through the duct 72 is of the order of 375° F. The velocity of the mass through the flash drier should preferably be controlled such that the temperature in the discharge duct 72 should not exceed 425° F. The fluid suspension then passes to the enlarged cyclone 73 in which the velocity is diminished and in which, due to the continual contact with the hot gases, additional amounts of moisture are evaporated from the solids. The dried solids are then picked up by fan 76, are intimately intermixed with cooler air drawn in through inlet 75 and are discharged through duct 77. Booster blower 78 picks up the product, cools it further, and forces it through the discharge line 79 to the cyclone 90, from the upper vent 91 of which hot gases are exhausted to atmosphere. The dried solids, which at this point are at a temperature of about 100° F. and a moisture content of from approximately 6 to 12% pass down to cyclone 90 and are discharged to the receiving hopper 92, or to any other convenient storage. From the hopper 92 the material may be directly discharged through the weighing mechanism 93 into bags or other receptacles for shipment.

The hot gases which separate from the dried solids in cyclone 73 pass outwardly through line 74 to the gas inlet 13 which is connected to the intake of the drier. As noted above, the temperature of the gases passing through this line is maintained at approximately 375° F. In order to accentuate the cooling of the solids in the lower portion of the cyclone, a fraction of the hot gases is continuously withdrawn through line 80 and are recycled through the gas circuit.

In the type of operation described, and in a plant capable of handling the slops from a 10,000 gallon alcohol unit, approximately 30 tons per day of dried feed may be obtained. The stated desirable moisture content of the preconditioned solids and the finally dried solids may be secured by controlling the temperature in the several sections of the circuit at the approximate values mentioned and by passing the solids through the flash drier and flash drier cyclone at a speed of approximately 100 feet per second, with an elapsed time through the flash drier and the flash drier cyclone of from about 20 to 30 seconds. In other words, the beneficial results of the invention may be secured by contacting a rapidly flowing stream of the preconditioned solids for a period of from about 20 to 30 seconds with a gaseous medium maintained at a temperature of the order of 475° F. and then very quickly reducing the temperature of the solids down to the order of 100° F. In these circumstances, the beer slops, containing about 7% total solids, are converted to a light, dried feed containing from approximately 6 to 12% of moisture and which feed analyzed from approximately 28% to 35%, or more, of proteins.

This material constitutes an excellent food of high dietetic value. It will be understood that this particular product, in view of the intimate or homogeneous distribution of the protein content, constitutes an excellent starting material for the production of protein plastics in that it not only contains a high percentage of reactive protein but also contains an excellent ultimate filler, namely, the celulosic hull fibers of the original grains.

I claim:

1. A method of recovering solids from distillery slop which comprises filtering the slop on a fixed screen, separately withdrawing the filtrate and screenings, discharging the screenings onto a subjacent vibratory screen and combining the drainings therefrom with the drainings from the first said screen.

2. A method of recovering solids from distillery slop which comprises filtering the slop on a fixed screen set at a predetermined pitch delivering the screenings therefrom onto a subjacent vibrating screen set at a pitch different from that of the fixed screen, the separated filtrate from the first screen being combined with the filtrate from the vibrating screen.

3. A method according to claim 7 in which the second screen is a vibrating screen.

4. An apparatus for separating the solids from distillery slop which comprises a fixed inclined screen, means to feed slop onto the screen, means to receive filtrate from the said screen, a second screen subjacent the first screen and adapted to receive screenings from the first screen, means to receive filtrate from said second screen, and means to directly receive filtrate from said second screen and the withdrawn filtrate from the first said screen, and means to impart vibratory movement to the second screen.

5. An apparatus for separating the solids from distillery slop which comprises, a fixed screen, means to feed slop to the screen, a second screen subjacent the first screen and adapted to receive screenings from the first screen, means to separately withdraw filtrate from the first screen and combine it with filtrate from the second screen, means to impart a vibratory movement to the second screen, and a press positioned subjacent the second screen and adapted to receive screenings from said second screen.

6. An apparatus for separating the solids from distillery slop which comprises, a fixed screen, means to feed slop to the screen, a second screen subjacent the first screen and adapted to receive screenings from the first screen, means to separately withdraw filtrate from the first screen and combine it with filtrate from the second screen, means to impart a vibratory movement to the second screen, and a press positioned subjacent the second screen and adapted to receive screenings from said second screen, and means to return filtrate from said press to said second screen.

7. A method of recovering solids from distillery slop which comprises passing the slop to one end of the fixed screen set on a pitch of from 10° to 15°, to drain off water and leave initially dewatered screenings discharging screenings from the lower end of such screen to the upper end of a vibrating screen set on a pitch of from 20° to 30° and discharging screenings from the lower end of the vibrating screen to a roller press and drying the press cake discharged from said press, and separately withdrawing the filtrates from the two screens as a combined product.

8. A method of recovering solids from distillery slop which comprises passing the slop to one end of the fixed screen set on a pitch of from 10° to 15° to drain off water and leave initially dewatered screenings, discharging screenings from the lower end of such screen to the upper end of a vibrating screen set on a pitch of from 20° to 30° and discharging screenings from the lower end of the vibrating screen to a roller press, and withdrawing the filtrates from the two screens as a combined product, drying the press cake discharged from said press and passing liquor expressed in the press back to the material traversing the vibrating screen.

9. A method of recovering solids from distillery slop which comprises passing the slop over a pair of angularly disposed screens, each having means for withdrawing filtrates and discharging same into as a common discharge means, the upper screen being a fixed screen set on a pitch of from 10° to 15°, discharging screenings from the lower end of such screen to the upper end of the second vibrating screen set on a pitch of from 20° to 30°, and discharging screenings from the lower end of the vibrating screen to a roller press, drying the press cake discharged from the press; collecting the liquor separated in the screens and press concentrating such liquor and absorbing the concentrated liquor in the dried press cake.

LEO M. CHRISTENSEN.